United States Patent [19]

Tice

[11] Patent Number: 6,014,084
[45] Date of Patent: Jan. 11, 2000

[54] ELECTRONIC SELF-LOCATING SYSTEM AND METHOD

[75] Inventor: Lee D. Tice, Bartlett, Ill.

[73] Assignee: Pittway Corporation, Chicago, Ill.

[21] Appl. No.: 08/858,675

[22] Filed: May 19, 1997

[51] Int. Cl.⁷ .................................................. G05B 23/02
[52] U.S. Cl. .............................. 340/825.08; 340/825.06; 340/825.52; 340/825.57; 370/241; 370/252; 370/254
[58] Field of Search ........................ 340/825.06, 825.08, 340/825.52, 825.54, 518, 825.57; 364/240, 244, 258, 259, 265, 271, 280; 370/241, 252, 254, 255, 257, 449, 485; 379/372, 241, 382; 455/401

[56] References Cited

U.S. PATENT DOCUMENTS

| | | | |
|---|---|---|---|
| 5,402,101 | 3/1995 | Berger et al. | 340/286.02 |
| 5,444,642 | 8/1995 | Montgomery et al. | 364/550 |
| 5,450,072 | 9/1995 | Vockenhuber | 340/825.52 |

*Primary Examiner*—Michael Horabik
*Assistant Examiner*—Jean B. Jeanglaude
*Attorney, Agent, or Firm*—Rockey, Milnamow & Katz, Ltd.

[57] ABSTRACT

A method and an apparatus for automatically locating detectors in an ambient condition monitoring system incorporate a normally closed contact for open circuiting the associated communication link. A command can be issued to the detectors and which identifies a specific detector. In response to the command, at least some of the detectors open circuit the communication link. The specific detector transmits neighbor identification signals in each direction on the communications link. These neighbor identification signals are sensed and stored in each neighbor detector. Information identifying detectors which are neighbors to a selected detector can then be analyzed to establish locations of the various detectors relative to one another in the system.

36 Claims, 4 Drawing Sheets

ELECTRONIC SELF-LOCATING SYSTEM AND METHOD

FIELD OF THE INVENTION

The invention pertains to building control systems. More particularly, the invention pertains to ambient condition detecting systems with interchangeable, spaced apart ambient condition detectors.

BACKGROUND OF TH INVENTION

Systems for monitoring regions of commercial and industrial establishments have been found to be useful for security and safety purposes. One type of system includes a control unit which is coupled to a plurality of spaced apart ambient condition detectors. The detectors can for example include smoke, flame, temperature or gas sensors. Such detectors are usually removably mountable on a permanently installed base. A given detector can be removed for maintenance or repair and then replaced on the respective base.

When the detector, or detectors is, are replaced on the respective base or bases, there is not necessarily any assurance that a given detector will be replaced on the base from which it was removed. This presents a problem to the control unit which must keep track of the locations of the detectors so as to be able to map a particular detector, which may be indicating the presence of an ambient condition of concern, into a physical location.

One solution to this problem has been disclosed and claimed in U.S. Pat. No. 5,357,243 entitled Electrical Unit with an Adjustable Mechanical Switch For Address Verification, assigned to the Assignee hereof. The system of the '243 patent while effective, required that address switches installed on the detector be set to an appropriate address corresponding to the address of the base. Hence, a mismatch between a base and a detector kept the detector from engaging the base.

In another known approach, the detectors are coupled in series to a communication line. The detectors open circuit the communication line, and then close circuit the line sequentially.

The control unit senses the first open circuited detector and it closes the circuit therethrough. The control unit then senses the second detector and it closes the circuit therethrough. Each of the detectors, which are serially linked to at least one other detector is then located relative to the adjacent detectors. In this approach, the control element is the only recipient of communications from the respective detectors. Detector identification takes place using current signals.

In yet another known system, the control element issues a command to a selected detector directing it to send a current pulse to the control element. The control element then checks to determine which detectors sensed the current pulse. Each detector on the loop between the current transmitting detector and the control element will sense the current pulse. This information can be used to establish the relative locations of the various detectors on the communications link.

There continues to be a need for systems and methods which can be used to automatically determine detector locations. Preferably such functionality could be provided without significantly increasing the complexity or cost of the associated monitoring systems.

SUMMARY OF THE INVENTION

A system and a method for locating units in a multiple unit communication system provide an automatic unit locating function. The locations of units can be changed. Subsequent to the change having taken place, the system and the method automatically determine the revised locations of the respective detectors.

To carry out the self-locating function, a command, which identifies a specific unit, is sent to all units. In response to the command, at least some of the units open circuit the associated communication link. Subsequently, some of the units, except for the identified selected unit, enter a mode for sensing on both sides of the open circuited communication link a neighbor identifying signal generated by the identified unit. The neighbor identifying signals are transmitted from the identified unit in both directions on the communications link.

The identified unit can also open circuit the communication link, simultaneously with the other units, in which case it sends the neighbor identification signal in both directions on the open circuited link. Alternately, the identified unit can permit the link to remain locally in a closed circuit state and apply neighbor identification signals thereto.

Respective units which sense the presence of a neighbor identifying signal store a representation of that signal. Subsequently, the link is returned to its normal close circuited state.

The stored representations of the neighbor identifying signals can be accumulated. The collected identifying neighbor identifying information for each of the units of the system, can be processed to establish the location of each unit relative to the others on the link.

In one aspect, the neighbor identifying information can be stored in the form of a table. The locations of the individual units can be determined from the information in the table.

In another aspect an ambient condition monitoring system incorporates a plurality of units. In response to open circuiting a communication link between the units, information as to the neighbors of at least selected units can be accumulated and analyzed. The units can then be located relative to one another.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
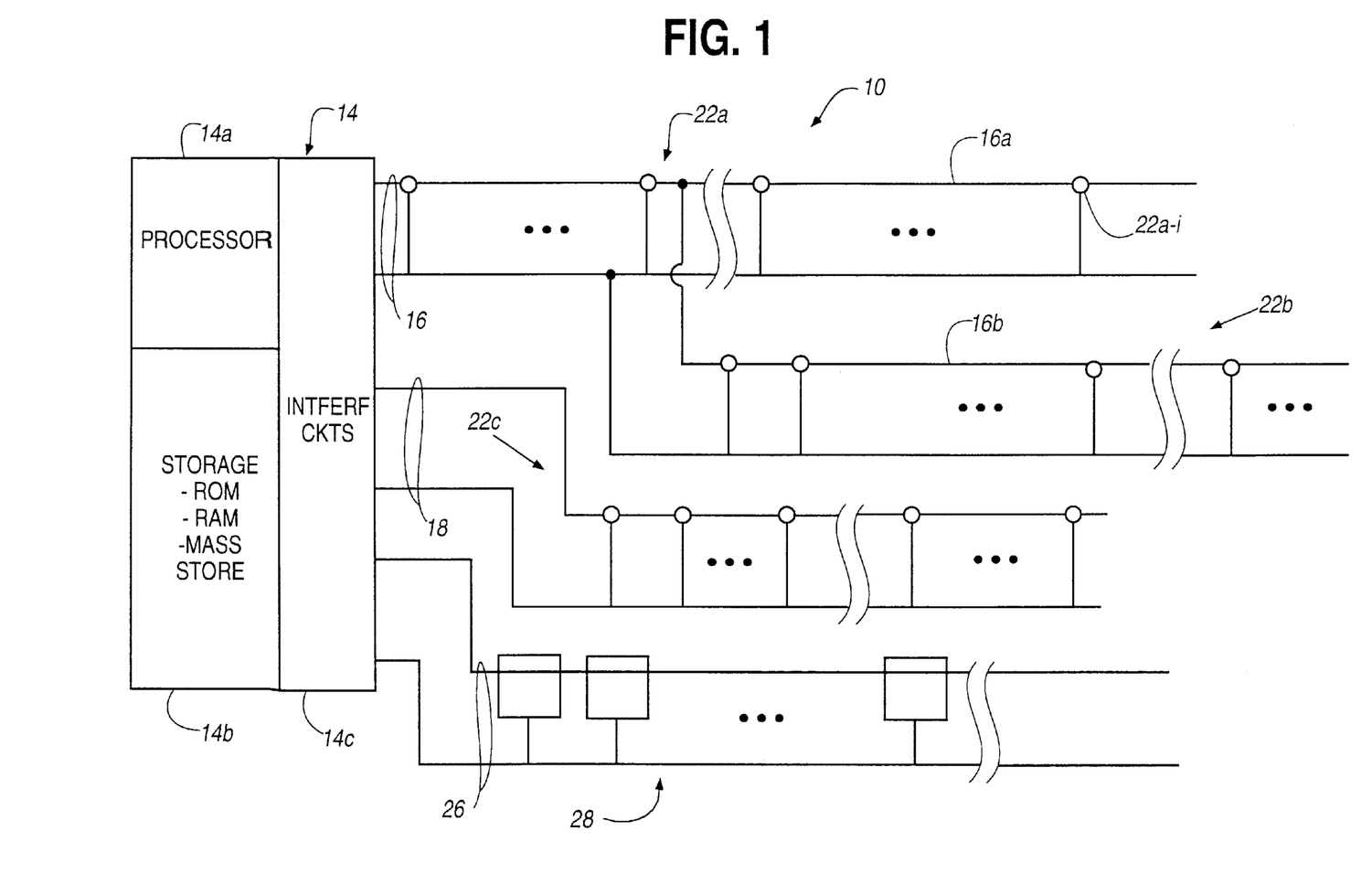
FIG. 1 is a block diagram of an ambient condition detecting system having a plurality of interchangeable, spaced apart electrical units.

FIG. 1 illustrates a system 10 with which the present invention can be used. The system 10 includes a control element 14 which can include for example, a programmable processor 14a, various types of storage elements 14b such as read-write memory, read-only memory and mass storage. Control element 14 also includes interface circuits 14c for communicating with other processors as well as assorted in-put/output devices.

Coupled to interface circuitry 14c is a communication link 16 which for example could be bidirectional. The link 16 has two sections, 16a and 16b. Each of the sections 16a, 16b could be implemented as a plurality of wire lines or other suitable links without limitation.

Coupled to the interface circuitry 14c is a second communication link 18. Unlike the link 16, which includes the sections 16a, 16b, link 18 includes a single selection. It will be understood that the exact technology used to implement the links 16, 18 may vary without departing from the spirit and scope of the present invention and could include one or more wireless sections.

The links 16 and 18 each have coupled thereto a respectively pluralities of electrical modules or units indicated generally at 22a, 22b and 22c. The electrical units 22a, 22b and 22c individually tend to be relatively low power elements such that a large number of them can be coupled to and powered off of the links 16, 18.

Some of the elements 22a, 22b, 22c could include control circuits or ambient condition detectors. Exemplary detectors could include smoke, flame or thermal detectors. Unit characteristics, except as described herein are not a limitation of the present invention.

Also coupled to the circuitry 14c is a higher power link 26 to which a plurality of higher power units 28 can be coupled where larger amounts of energy are needed to energize each of the units or modules. These units could provide various types of outputs, such as audible or visual indicators, without limitation.

In the system 10, the modules 22 and 28 are all intended to be removable and replaceable for maintenance and modification purposes. The control element 14 can include circuitry and/or pre-programmed commands, as discussed subsequently, for the purpose of locating the members of the pluralities 22a and 22b relative to one another on the link 16. It will be understood that the below described apparatus and methodology could be incorporated, without limitation, into one of the electrical modules or units coupled to a respective link, such as the unit 22a–i without departing from the spirit and scope of the present invention. Such a variation might not need a control element such as 14.

Figure 2:
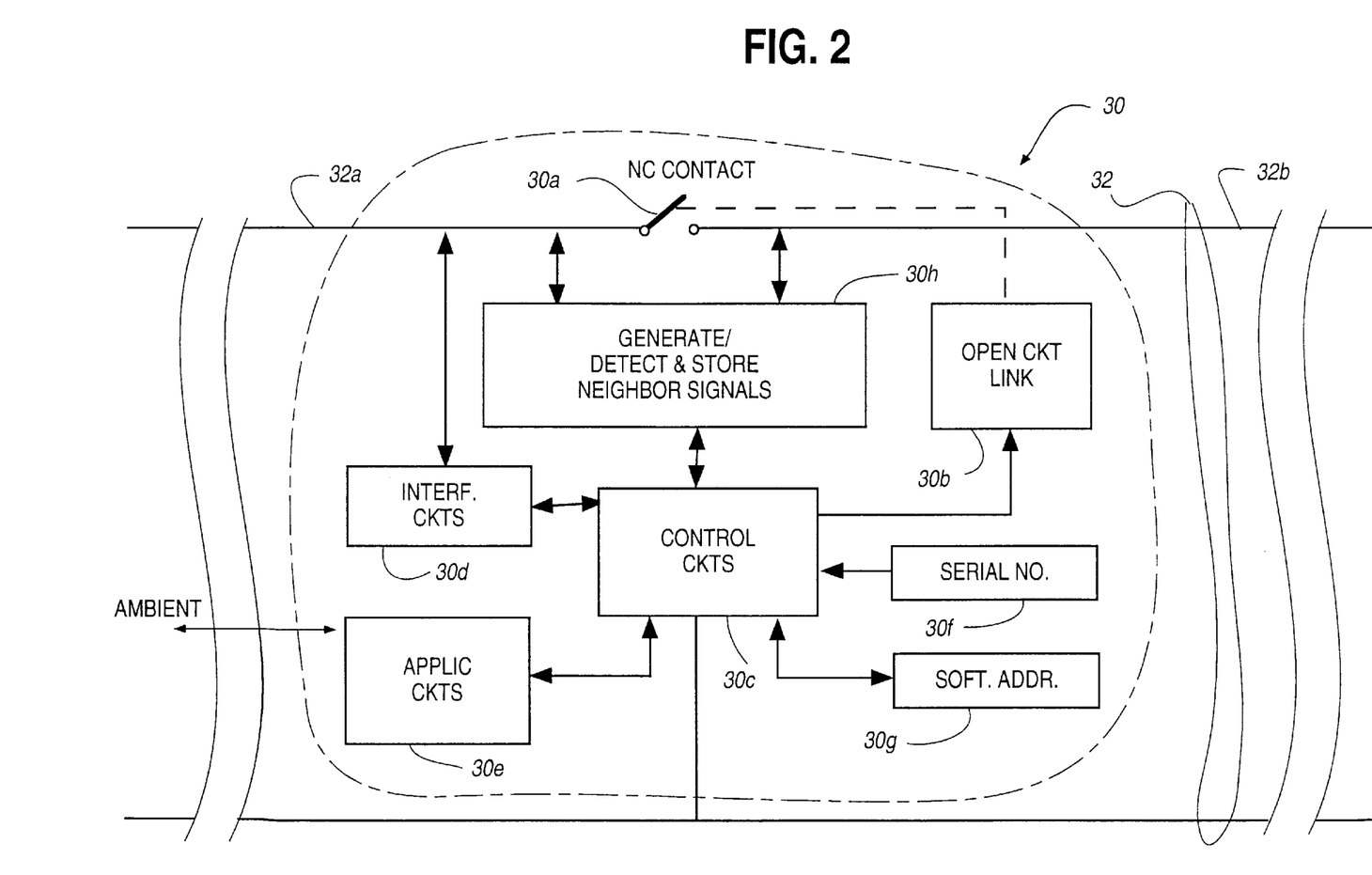
FIG. 2 is a block diagram of an exemplary electrical unit.

FIG. 2 illustrates schematically an electrical unit or module 30, which could correspond to any one of the modules 22a, 22b, 22c or 28. The module 30 is electrically coupled to a respective communication link 32 which could correspond to any of the links 16, 18 or 26.

The module 30 includes a normally closed electrical contact 30a which can be intermittently opened by circuitry 30b when energized. The module 30 also includes control circuitry 30c which could incorporate a programmed processor and a set of commands for carrying out one or more control functions. Coupled to the control circuitry 30c is a set of interface circuits 30d for receiving information from and/or transferring information to the communication link 32.

Coupled to the control circuit 30c are respective application circuits 30e which could include sensors of various types as well as input/output circuitry for purposes of controlling or receiving feedback signals from various types of devices in an adjacent region. The specific characteristics of the circuits 30e are not a limitation of the present invention.

The control circuitry 30c also includes a register 30f, which could be implemented as a location in a read-only memory, which carries a permanently written serial number or address for the device 30. A writable memory 30g can be used for purposes of storing a soft address or a logical address assigned by the control element 14.

Also coupled to control circuitry 30 is circuitry 30h which is adapted to generate neighbor designating signals on both sides 32a, 32b of the normally closed contract 30a. The circuitry 30h also includes circuitry for detecting the appearance of neighbor indicating signals generated by modules adjacent to the module 30 on the segments 32a, 32b.

Figure 3:
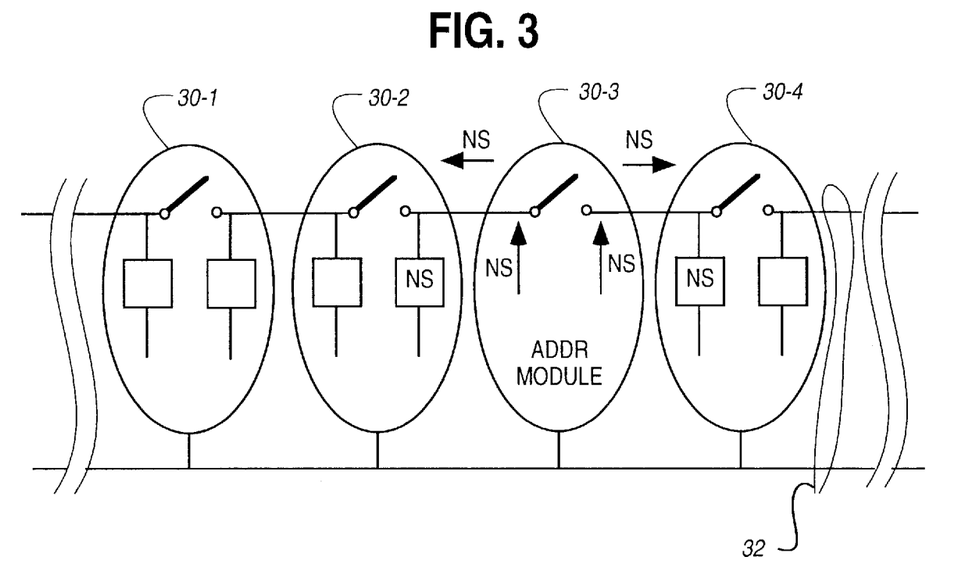
FIG. 3 is a partial view of the communication link of FIG. 1 illustrating a portion of the method of locating one or more electrical units.

FIG. 3 further illustrates characteristics of the present apparatus and method. The exemplary structure of FIG. 3 includes a plurality of modules 30-1 . . . 30-4. For exemplary purposes only, each of the modules in FIG. 3 includes a normally closed contact, corresponding to the contact 30a. Not all modules need to be able to open circuit the link.

The serial numbers or addresses of the units are first established. This process can be carried out manually or automatically and is not a limitation of the present invention.

A locate command is sent via link 32 to the modules 30-1 . . . 30-4. That command can originate from one of the modules on the link, such as the module 22a–i or alternately from the control element 14.

The locate command specifies the address of a particular module, such as the module 30-3. In response to the command, the modules on the link 32 open a normally closed contact, corresponding to the contact 30a. The addressed module 30-3 can open circuit its respective contact or not without departing from the spirit and scope of the present invention.

During the time all of the other devices on the link 32 in FIG. 3 have open circuited the link, the addressed module 30-3 transmits on the link 32a signal, NS, to be received by adjacent modules. As illustrated in FIG. 3, the signal NS will be received by the modules 30-2 and 30-4 and can temporarily be stored therein, or a flag set therein, in circuitry 30h.

Subsequently, the units 30-1 . . . 30-4 permit their respective contacts, corresponding to the contact 30a, to reclose restoring the information carrying integrity of the link 32. In response to a subsequent command from the electrical module which issued the locating command, those modules which have stored a representation of the neighbor indicating signal NS, namely devices 30-2 and 30-4 will respond by forwarding their respective serial number or address indicating that they detected a signal from an adjacent module or neighbor.

The above command sequence is repeated for all of the devices on a given link, such as the devices 22a and 22b. The stored information concerning neighbors of all of the modules on a given link can then be processed to establish the relative locations of the modules on the link. The information can be stored as a table or matrix in a memory unit and analyzed.

Figure 4:
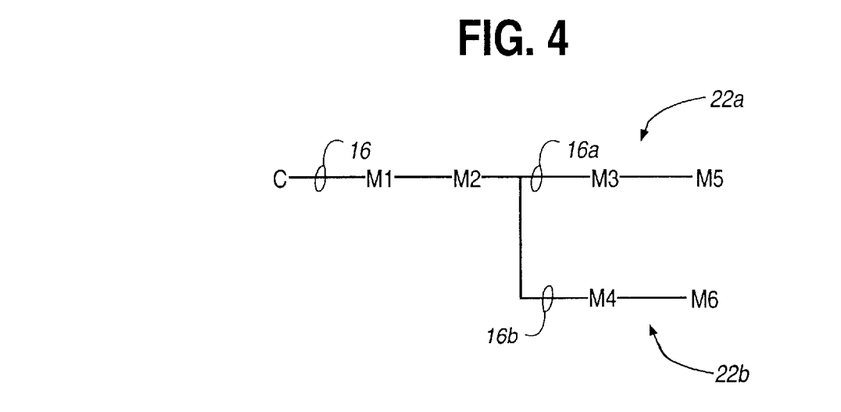
FIG. 4 is a schematic diagram illustrating an exemplary system wherein the electrical units need to be located.

By way of example, FIG. 4 illustrates a control element C, coupled to pluralities of modules M1–M6 corresponding to the pluralities 22a, 22b of the link 16.

In the matrix, the control element is listed as a neighbor to the device(s) on the link. In the following tables, Mi indicates the module serial number.

TABLE 1

| Module | Neighbor(s) | Used Flag |
|---|---|---|
| C: | M1 | |
| M1: | M2 | |
| M2: | M1, M3, M4 | |
| M3: | M2, M5 | |
| M4: | M2, M6 | |
| M5: | M3 | |
| M6: | M4 | |

Table 1 represents neighbor information for each module including the control element received from the system of FIG. 4. The matrix of Table 1 can now be decoded to determine the configuration of the system 10 and relative positions of devices in the system.

Figure 5A:
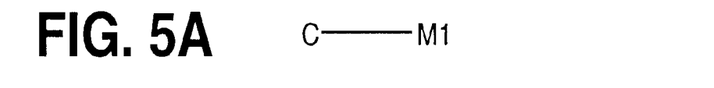
FIGS. 5A through 5E taken together illustrate aspects of a method of locating electrical units of the system illustrated in FIG. 4.

The control element C occupies the first array position. The "neighbor" column of Table 1 indicates those devices detected as neighbors of respective modules. Module M1 was detected as the sole neighbor of the control element as illustrated in FIG. 5A.

As illustrated in Table 2, the "used flag" for C and M1 has been set. In subsequent processing, module M1 will not be considered by other devices as another new device in forming the decoding tree.

TABLE 2

| Module | Neighbor(s) | Used Flag |
|---|---|---|
| C: | M1 | 1 |
| M1: | M2 | 1 |
| M2: | M1, M3, M4 | |
| M3: | M2, M5 | |
| M4: | M2, M6 | |
| M5: | M3 | |
| M6: | M4 | |

Figure 5B:
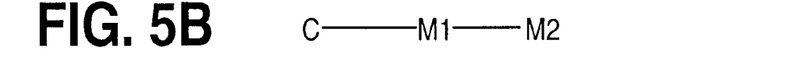
Figure 5C:
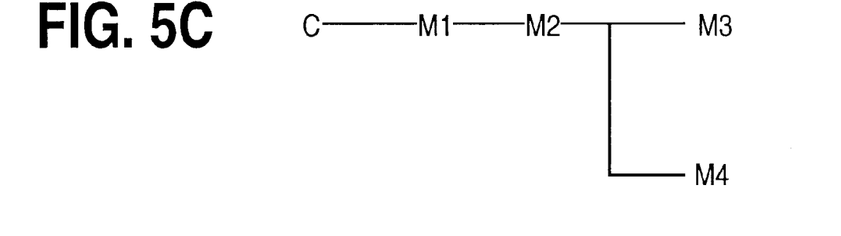

In the next step, the neighbors of module M1 are now added to the decoding tree as illustrated in FIG. 5B. Module M2 was detected as a neighbor of module M1. Hence, M2 is the next module on the link.

As illustrated in Table 3 the "used flag" module for M2 has been set. In subsequent processing, module M2 will not be considered by other devices as another new device in forming the decoding tree.

TABLE 3

| Module | Neighbor(s) | Used Flag |
|---|---|---|
| C: | M1 | 1 |
| M1: | M2 | 1 |
| M2: | M1, M3, M4 | 1 |
| M3: | M2, M5 | |
| M4: | M2, M6 | |
| M5: | M3 | |
| M6: | M4 | |

In the next step, the neighbors of module M2 are added to the decoding tree as illustrated in FIG. 5B. Modules M1, M3, and M4 were detected as neighbors of modules M2. M1 already has its used flag set so modules M3 and M4 are the next modules on the link. At this juncture Table 3 is indicating that there is a branch or "T" on the link since two devices have now been added to the decoding tree.

As illustrated in Table 4, the "used flag" for modules M3 and M4 has been sent. Hence, these modules will not be considered by other modules as another new module(s) in forming the decoding tree.

TABLE 4

| Module | Neighbor(s) | Used Flag |
|---|---|---|
| C: | M1 | 1 |
| M1: | M2 | 1 |
| M2: | M1, M3, M4 | 1 |
| M3: | M2, M4, M5 | 1 |
| M4: | M2, M6 | 1 |
| M5: | M3 | |
| M6: | M4 | |

Figure 5D:
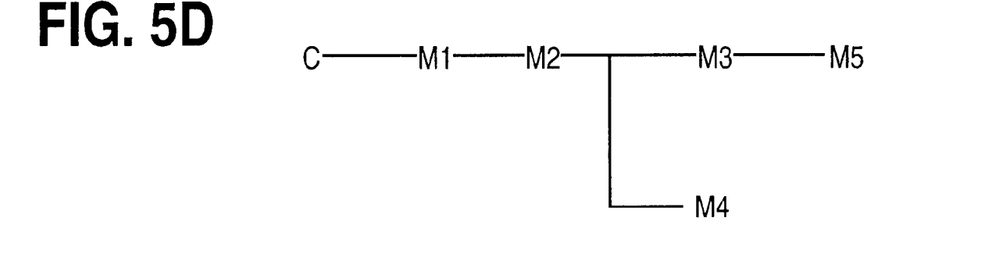

In the next step, the neighbors of module M3 are added to the decoding tree as illustrated in FIG. 5D. Modules M2, M4 and M5 were detected as neighbors to Module M3. Modules M2 and M4 already have their used flag set. Hence, module MS is the next one on the link.

As illustrated in Table 5, the "used flag" for module M5 has been set. In subsequent processing, this module will not be considered by other modules as another new module in forming the decoding tree.

TABLE 5

| Module | Neighbor(s) | Used Flag |
|---|---|---|
| C: | M1 | 1 |
| M1: | M2 | 1 |
| M2: | M1, M3, M4 | 1 |
| M3: | M2, M4, M5 | 1 |
| M4: | M2, M3, M6 | 1 |
| M5: | M3 | 1 |
| M6: | M4 | |

Figure 5E:
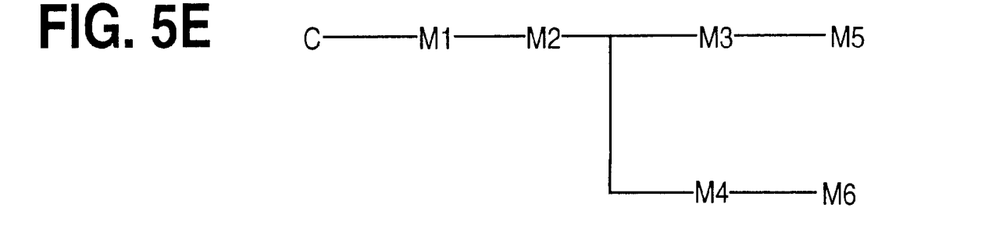

In the next step, the neighbors of module M4 are added to the decoding tree as illustrated in FIG. 5E. Modules M2, M3 and M6 were detected as neighbors to module M4. Modules M2 and M3 already have their used flag set so M6 is the next, module on the link from M4.

As illustrated in Table 6, the "used flag" for module M6 has been set. Hence, this device will not be considered by any other device as another new device in forming the decoding tree.

TABLE 6

| Module | Neighbor(s) | Used Flag |
|---|---|---|
| C: | M1 | 1 |
| M1: | M2 | 1 |
| M2: | M1, M3, M4 | 1 |
| M3: | M2, M4, M5 | 1 |
| M4: | M2, M3, M6 | 1 |
| M5: | M3 | 1 |
| M6: | M4 | 1 |

In the next step, the neighbors of module M5 are added to the decoding tree. Module M3 was detected as a neighbor of module M5. M3 already has a used flag set so there are no additional devices on the link that are neighbors of module M5.

In the next step, the neighbors of module M6 are added to the decoding tree. Module M4 was detected as a neighbor of Module M6. Module M4 already has a used flag set. This indicates there are no additional devices on the link that are neighbors of module M6.

All devices have been located on the line. The above described method will work for wiring configurations that have multiple branches and for any number of modules.

The next step is the downloading of soft addresses, if desired. If an installer specifies automatic, the control element 14 will automatically download "soft" addresses to the modules based upon their location. The nearest module to the control element 14 is assigned an address of "1". Next device is 2, etc.

When a T-tap or branch is encountered, the addressing will progress out one branch until it ends. Addresses will then be assigned to modules on the second branch. Groups are also automatically formed based upon T-taps if an output device is included in the T-tap. Otherwise, all devices and output devices will be considered a single group. Alternately, it will be necessary to individually program each module on the link with soft address.

When a module is removed, a trouble indicator is provided at the control element 14. The location of the trouble is noted.

If a module, say M7, is then plugged into the link, it will transmit to the control element 14 that it is a new device. The control element will address this module and obtain the serial number and type.

A command can then be sent to direct module M7 to transmit identification signals to neighbors. A global command can then be sent to have devices transmit their serial number if they saw M7. If M7 now occupies the M4 position, it will be automatically loaded with the soft address presently used for M4 and the system will return to normal operation.

A display at the control element 14 will show a record of events. The record of events can be logged on a printer at the control unit 14.

In the event that three devices were removed in a row and only one new device installed, the control element 14 will not be able to determine what position it should be in. In this case, it will not assign a soft address to the device and will continue to indicate a trouble condition. This device can still transmit an alarm condition to the system but it is not part of any group.

Until all devices are installed and the line configuration is re-established the control element will continue to indicate a "trouble" condition. If a new device is added and the line configuration is changed, then the installer can override the programming and create a new configuration.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method of locating at least one unit in a multiple unit communication system wherein the units communicate via a communication link and wherein at least some of the units include circuitry to open circuit the link, the method comprising:
    issuing an open circuit command via the link whereupon, at least some of the units open circuit the link;
    transmitting at least from a selected unit, on the link, at least one neighbor identifying signal; and
    storing a representation of a received identifying signal at any neighbor of the selected unit.

2. A method as in claim 1 which includes:
    repeating the steps for at least some of the remaining units.

3. A method as in claim 1 which includes:
    processing the neighbor unit identifying information to locate at least the one unit.

4. A method as in claim 1 which includes transmitting neighbor unit identifying information for the selected unit to a control device.

5. A method as in claim 4 which includes establishing an identifier for each of the units in communication with the control device.

6. A method as in claim 5 which includes in the establishing step, transmitting to the units a plurality of commands which direct the units to present their respective identifiers to the control unit and wherein the control unit, in response thereto, establishes a plurality of unit identifiers present in the system.

7. A method as in claim 1 wherein the open circuit command includes, open circuiting the communication link at the selected unit to establish the identity of one or more neighbors.

8. A method as in claim 1 which includes storing a representation of the identifying signal at the neighbors of the selected unit subsequent to open circuiting the link.

9. A method as in claim 7 wherein the storing step includes setting a status flag in each unit which receives a neighbor identifying signal from another unit.

10. A method as in claim 8 wherein the transmitting step includes transmitting neighbor identifying information to a control unit from all units except the selected unit.

11. A method as in claim 3 wherein the processing step includes processing neighbor identifying information associated with all of the units to locate the one unit.

12. A method as in claim 3 wherein the processing step includes building at least one table which identifies neighbors of at least some of the units in the system.

13. A system comprising:
    a plurality of electrical modules; and
    a communications link wherein the communications link interconnects the modules, wherein at least some of the modules each include circuitry for open circuiting the communications link so as to identify neighbors of each respective module and wherein at least one of the modules includes circuitry for issuing a command to at least some of the other modules to substantially simultaneously open circuit the link at a plurality of locations and then after a common, predetermined, period of time close circuit the link.

14. A system as in claim 13 wherein at least one module includes circuitry for generating an identifier to be transmitted via the link to at least some of the modules.

15. A system as in claim 13 which includes a control unit coupled to the link.

16. A system as in claim 15 wherein the control unit includes circuitry for storing indicia indicative of determined neighbors of at least some of the modules.

17. A system as in claim 16 wherein the control unit includes circuitry for processing the stored indicia to determine where on the communications link the modules are located.

18. A system as in claim 13 wherein some of the modules each include drive circuitry for applying neighbor specifying electrical signals to the open circuited communications link.

19. A system as in claim 13 wherein the communications link includes at least first and second inter-connected branches.

20. A system as in claim 18 wherein the modules include circuitry for detecting the neighbor specifying signals.

21. A system as in claim 18 wherein the modules include circuitry to transmit neighbor signals in two directions on the link simultaneously with the link being open circuited.

22. A system as in claim 18 wherein each module includes circuitry for detecting neighbor signals present on each side of the link while the link is open circuited.

23. A system as in claim 18 wherein the units each include circuitry for storing a representation of a sensed neighbor signal.

24. A system as in claim 23 wherein the modules include circuitry for transmitting the stored representations to the control unit.

25. A system as in claim 13 wherein some of the modules include a smoke detector.

26. A system as in claim 16 wherein the control unit includes circuitry to store the indicia in the form of a table.

27. A system as in claim 24 wherein the control unit includes circuitry for storing the received representations of sensed neighbor signals.

28. A system comprising:

a plurality of ambient condition detectors;

a communications link wherein the communications link interconnects the ambient condition detectors, wherein some of the detectors each include circuitry for open circuiting the communications link so as to identify neighbors of each respective detector and circuitry coupled to the link for issuing a command to the detectors to substantially simultaneously open circuit the link at those detectors and then after a common predetermined period of time close the link.

29. A system as in claim 28 which includes circuitry for storing indicia indicative of determined neighbors of each of the detectors.

30. A system as in claim 29 which includes circuitry for processing the stored indicia to determine where on the communications link the detectors are located.

31. A method as in claim 1 including storing in each of the units a unique unit identifier;

transmitting a unit identifier via the link, to specify the selected unit, in addition to the open circuit command;

recognizing the identifier at the selected unit and transmitting from that unit the neighbor identifying signal.

32. A method as in claim 1 which includes, at the respective units, coupling an element in series with the link, to open circuit the link thereby blocking a flow of current on the link.

33. A method as in claim 32 wherein the elements open circuit the link, at respective units, by forming a gap in the link.

34. A method as in claim 32 which includes open circuiting the link, at the respective units, by moving a mechanical contact from a first position wherein current can flow on the link, through the contact, to a second position wherein current can not flow through the contact.

35. A system as in claim 13 wherein at least some of the modules include a two state element with a low impedance state and a high impedance state, wherein the element is connected in series with the link whereupon the element open circuits the link when in the high impedance state.

36. An electrical unit connectable to at least a two conductor communication link, the unit comprising:

a control circuit;

a controllable element having a short circuit state and an open circuit state wherein the element is coupled via a control input to the control circuit and the element is connectable in series with one of the conductors of the link whereby when the element exhibits an open circuit at least the one conductor is open circuited;

circuitry for generating neighbor designated signals on the link on each side of the element; and circuitry for detecting neighbor indicating signals on the link when the element is exhibiting an open circuit state.

* * * * *

UNITED STATES PATENT AND TRADEMARK OFFICE
CERTIFICATE OF CORRECTION

PATENT NO. : 6,014,084
DATED : January 11, 2000
INVENTOR(S) : Lee D. Tice

It is certified that error appears in the above-identified patent and that said Letters Patent is hereby corrected as shown below:

Col. 1, line 8, "TH" should be -- THE -- ;
Col. 1, line 18, a "," should be placed after "detectors" and the word -- are -- should be deleted;

Col. 3, line 25, "pluralities" should be -- plurality -- ;
Col. 6, line 20, "MS" should be -- M5 -- .

Signed and Sealed this

Sixteenth Day of January, 2001

Attest:

Attesting Officer

Q. TODD DICKINSON
Commissioner of Patents and Trademarks